United States Patent [19]

Price et al.

[11] 3,730,006

[45] May 1, 1973

[54] GEAR DRIVE ASSEMBLY FOR ANTI-WHEEL LOCK-UP CONTROL SYSTEMS IN MOTOR VEHICLES

[75] Inventors: Robert B. Price, Manchester; Francis W. Stager, Stafford Springs, both of Conn.

[73] Assignee: The Jacobs Manufacturing Company, West Hartford, Conn.

[22] Filed: June 7, 1971

[21] Appl. No.: 150,294

[52] U.S. Cl. .................................................. 74/13
[51] Int. Cl. ............................................. F16h 37/00
[58] Field of Search .................... 74/12, 13, 411, 443; 188/181 A; 303/21 R, 21 CG; 180/53 WA, 53 A, 53 B, 53 R

[56] References Cited

UNITED STATES PATENTS

| | | | |
|---|---|---|---|
| 3,046,060 | 7/1962 | Stager et al. | 303/21 CG |
| 3,554,613 | 1/1971 | Fiscus et al. | 188/181 A |
| 3,534,625 | 10/1970 | Haviland | 74/443 X |

*Primary Examiner*—Milton Kaufman
*Assistant Examiner*—Frank H. McKenzie, Jr.
*Attorney*—Stephen J. Rudy

[57] ABSTRACT

A gear drive assembly for use in an anti-wheel lock-up control system to transmit rotation of a wheel of a motor vehicle to a control device. One embodiment includes gearing connected with the drum and confined within its interior having connection by means of a flexible casing and drive shaft with an externally located control device.

In a second embodiment including the flexible casing and shaft, the gearing is arranged adjacent the open end of the drum.

In a third embodiment, the flexible casing and shaft is omitted and the control device is connected directly with the gearing located adjacent the open end of the drum.

In each embodiment, a dust cover arrangement over the open end of the drum protectively guards the drum and gearing against entry of foreign matter.

6 Claims, 9 Drawing Figures

Patented May 1, 1973  3,730,006

INVENTORS
ROBERT D. PRICE
FRANCIS W. STAGER
BY
Stephen J. Rudy
ATTORNEY

Patented May 1, 1973

INVENTORS
ROBERT B. PRICE
FRANCIS W. STAGER
BY
Stephen J. Rudy
ATTORNEY

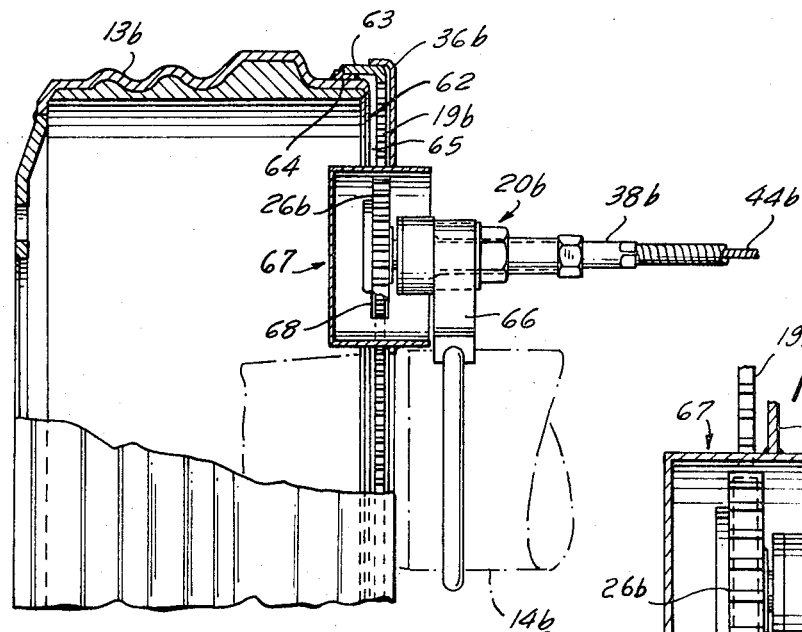
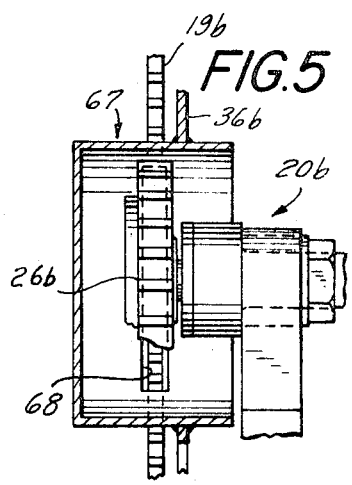
FIG.4
FIG.5
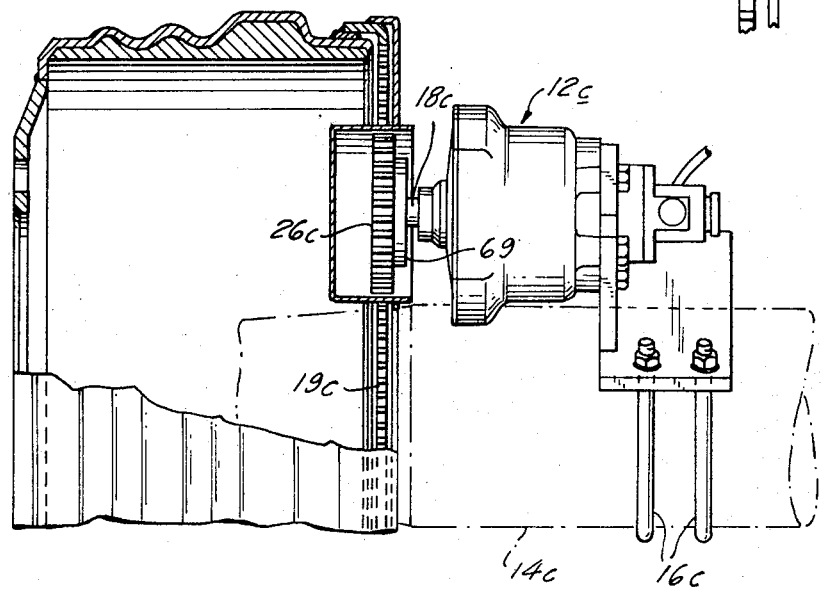
FIG.6
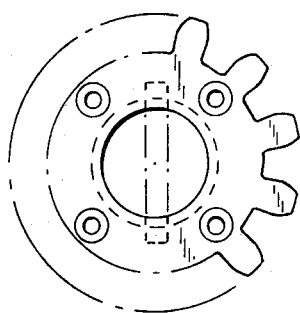
FIG.7
INVENTORS
ROBERT & PRICE
FRANCIS W. STAGER
BY
Stephen J. Rudy
ATTORNEY

GEAR DRIVE ASSEMBLY FOR ANTI-WHEEL LOCK-UP CONTROL SYSTEMS IN MOTOR VEHICLES

BACKGROUND OF THE INVENTION

This invention relates to the art of anti-wheel lock-up control systems. It is particularly directed to a gear drive assembly for transmitting the rotation of a wheel of a motor vehicle to an anti-wheel lock-up control device.

Gear drive assemblies for transmitting rotation of a wheel to a sensing device are known from U.S. Pat. Nos. 3,534,625, 3,447,838, 3,046,060 and 2,107,823. These present various problems arising from exposure of gearing portions of the assembly to elements of the weather, or arising from unduly crowding the interior of an associated brake drum with bulky mechanism.

The objective of the present invention is to avoid these problems of the known devices by associating the gearing with the brake drum in a manner whereby it is protectively guarded against foreign matter; and does not unduly crowd the interior of the drum; and by locating the sensing or anti-wheel lock-up control device externally of the drum.

In one embodiment of the invention, the gearing is confined deeply within the interior of the drum, and is connected by means of a flexible shaft with the externally located control device.

In a second embodiment, the gearing is located adjacent the open end of the drum where it is protectively guarded against the elements of the weather; and it is connected by means of a flexible shaft with the externally located control device.

In each of these two embodiments, because of the flexible shaft, the control device may be mounted to any convenient support of the vehicle, and need not be axially aligned with the axis of the gearing or drum.

In a third embodiment, the gearing is also protectively located adjacent the open end of the drum, but in this embodiment the externally located control device is connected by a pinion directly to the gearing, the flexible shaft connection being omitted.

BRIEF DESCRIPTION OF THE DRAWING

In the accompanying drawing:

FIG. 4 represents a modification of the embodiment shown in FIG. 1; it shows the gear drive arranged at the open edge of the brake drum;

FIG. 5 is an enlarged detail of the pinion shield and related components shown in FIG. 4;

FIG. 6 is a further embodiment of the invention in which the flexible casing and drive shaft are omitted, and the externally located control device is geared directly to the brake drum;

FIG. 7 represents a form which the pinion in the various embodiments may take;

DESCRIPTION OF PREFERRED EMBODIMENTS

Figure 1:
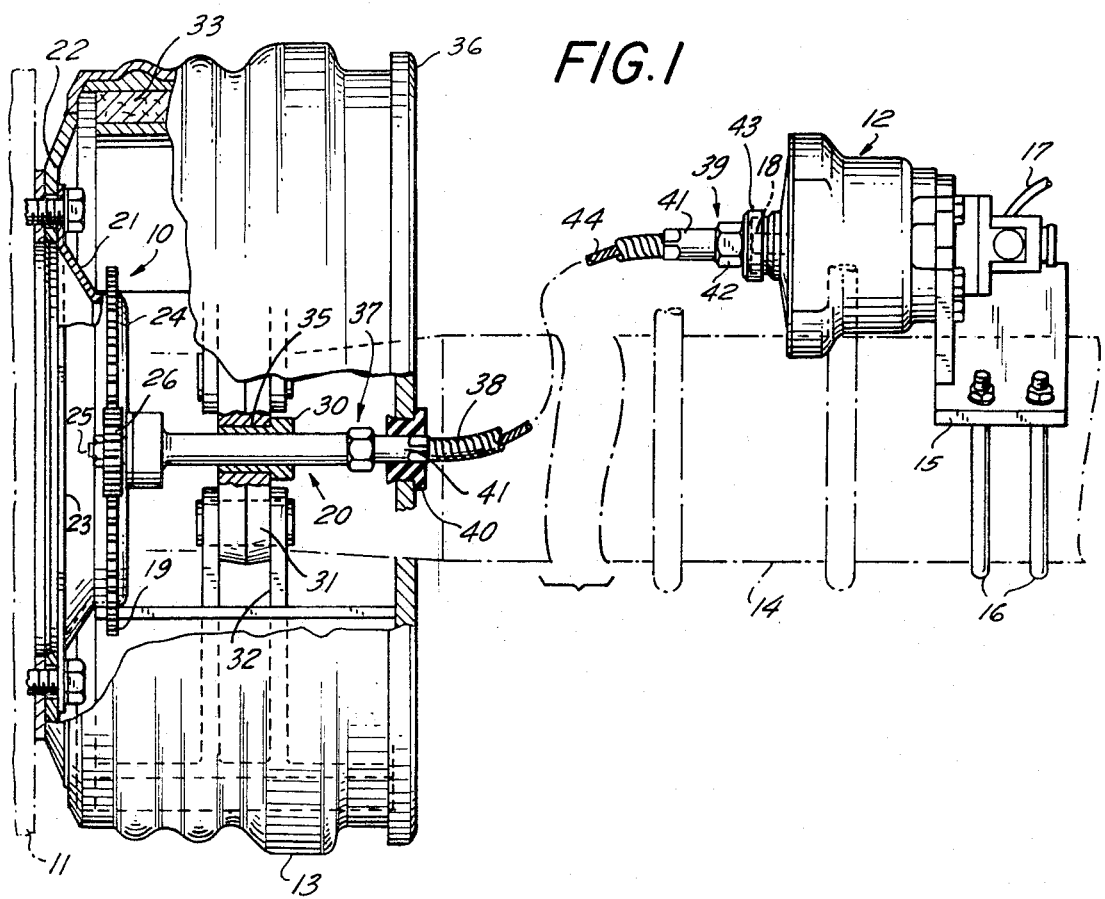
FIG. 1 is a side elevational view illustrating a first embodiment of the invention in which the gear drive is confined within the brake drum and is connected by means of a flexible casing and drive shaft to an externally located anti-wheel lock-up control device.
Figure 2:
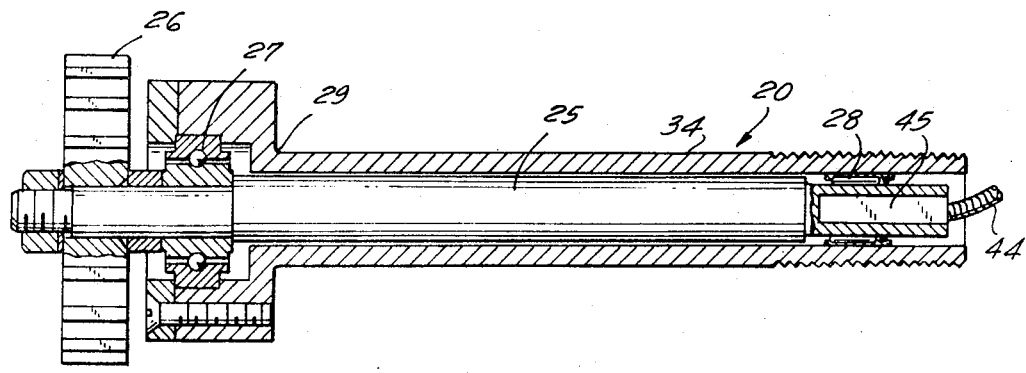
FIG. 2 is a detail in section of the spindle assembly.

Reference is now directed to the embodiment illustrated in FIGS. 1-2, wherein a gear drive assembly, generally indicated at 10, is arranged to transmit rotation of a wheel 11 of a motor vehicle, such as a truck, to drive an anti-wheel lock-up control device 12. The wheel, shown in broken line, is attached in conventional manner to a brake drum 13, which in turn is rotatably mounted in conventional manner to an axle 14.

The control device 12 is of a known type such as that described in U.S. Pat. No. 3,447,838. It is detachably mounted by means of a bracket 15 to a convenient support in the general vicinity of the inner area of the wheel. Here, the support is shown as the axle 14 of the vehicle. The bracket is rigidly clamped upon the axle by means of a pair of U-bolts 16.

The control device is interconnected in the usual air-brake service line 17 between the pressure air service tank (not shown) and the pressure air-brake chamber (not shown) related to the wheel.

In the operation of the control device, rotation of wheel 11 and the brake drum 13, to which the wheel is attached, is transmitted through the gear drive assembly 10 to an input drive shaft 18 of the control device. Shaft 18 operates to drive internal mechanism of the control device. This mechanism responds to rapid changes in deceleration and acceleration of the wheel to cause alternate relief of brake service air from, and feeding of service air to, the pressure air brake chamber so as to control braking action on the wheel when a wheel lock-up condition is imminent. This controlled braking action avoids development of a wheel lock-up condition and consequent skidding. The control device is described in greater detail in U.S. Pat. No. 3,447,838.

The gear drive assembly 10 includes a ring gear 19 confined within the interior of the brake drum. The gear is fixed upon a bracket 21 which is rigidly fastened to the interior face of the back wall 22 of the drum so that the gear has rotation as a unit with the drum.

The bracket 21 is shown as having an annular base plate 23 or rim detachably fastened to the back wall of the drum; and has an offset axially extending centrally open crown portion 24 through which the axle 14 passes. The ring gear is mounted, as by welding, upon this crown portion in coaxial relation to the drum and in a desirable spaced relation to the back wall 22 as well as to the surrounding wall of the drum. The spacing enables a desirable unobstructed association of a pinion 26 with the gear.

The pinion is also confined within the interior of the drum. It has a driven engagement with the teeth that extend around the periphery of the gear. The pinion is mounted to the inner end of a spindle member 25 of a spindle assembly 20 (FIG. 2). The spindle is journaled in bearings 27 and 28 supported in a spindle housing 29. The spindle housing is mounted rigidly to a stationary support 31 provided in the interior of the drum so that the pinion rotates relative to the spindle housing and is maintained in a fixed position relative to the gear 19.

The support 31 is here shown as the central body portion of a brake spider 32. The latter is mounted coaxially in conventional manner fast to the axle and carries the usual brake shoes 33. In mounting the spindle assembly to the spider 31a, a reduced stem 34 of the spindle housing is passed through an enlarged eccentrically located opening 35 in the body of the spider. The spindle housing is then axially positioned to carry the pinion 26 into proper meshing engagement with the gear 19. The spindle housing is then locked and securely restrained in this position against endwise or rotative movement relative to the gear and spider. A resilient locking sleeve 30, press-fitted around the spindle housing into the spider opening 35, is provided to obtain this locked condition.

The stem 34 of the spindle housing extends beyond the body of the spider into the vicinity of the customary brake drum dust cover 36. The latter has a stationary condition with the axle so that the brake drum rotates in usual manner with the wheel relative to the cover. The cover serves its usual function of keeping dust, dirt and other foreign matter from entering the drum and contaminating the braking mechanism. Now, it also protectively guards the ring gear 19, pinion 26 and spindle assembly 20 from such elements.

The spindle housing is detachably coupled as at 37 to one end of a flexible casing 38, the other end of the casing is detachably coupled as at 39 to the housing of the control device 12. The coupling at 37 is defined by means of an adapter 41 fixed to an end of the flexible casing and by means of a nut on the adapter threadedly engaged with the spindle housing. The coupling at 39 has a similar adapter 41 fixed to the flexible casing and a nut 42 engaging an adapter 43 threaded upon an axial projection of the control device. The adapter end 37 of the casing passes through an opening in the drum cover. A suitable resilient bushing 40 seals the opening in the dust cover around the adapter.

A flexible shaft 44, extending through the casing and supported therein in conventional manner for rotation relative to the casing, has a splined driven connection 45 at one end with the spindle 25; and has a similar splined driving connection at its other end with the input shaft 18 of the control device 12.

It can be seen that, by means of the gear drive assembly 20, rotation of the wheel 11 and drum 13 will be transmitted to drive the internal mechanism of the control device 12.

As earlier mentioned, the gearing and spindle assembly are protectively confined or "buried" within the interior of the drum where they are guarded against damage and accumulations of dirt which might otherwise interfere with their efficient operation.

The assembly comprising the flexible shaft 44 and its casing 38 is of advantage in that it permits the control device 12 to be located externally of the drum and to be located remotely from the related wheel 11; it does not require the input shaft 18 of the control device to be axially aligned with the axis of the pinion 26; and it enables the control device to be mounted to any suitable support in the general vicinity of the wheel.

Figure 3:
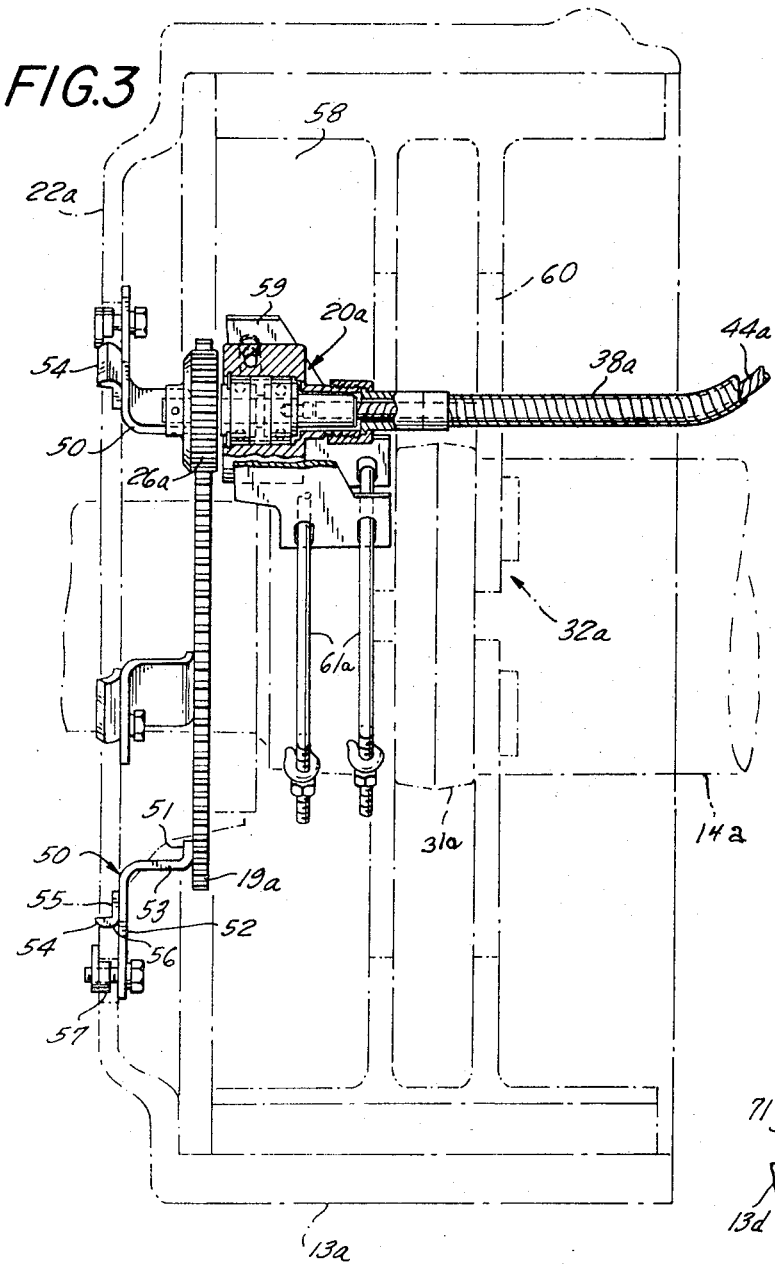
FIG. 3 represents a modification of the embodiment shown in FIG. 1 with respect to the arrangement of the gear drive and spindle assembly within the brake drum.

FIG. 3 discloses a modified embodiment of the arrangement shown in FIG. 1. In this arrangement, the ring gear 19a is supported to the back wall of the drum coaxially with the drum and in spaced relation to the back wall by means of a group of supports 50. Each support has a short arm 51 which is fixed, as by welding or other suitable manner, to the back face of the body of the ring gear. The supports are located angularly about the ring gear in equally spaced relation to each other. Here, a suitable number of these supports are employed, three of which are shown. Each support has a relatively longer arm 52 which is offset in parallel spaced relation to the short arm and to the body of the ring gear by means of an axially extending bridge portion 53. Each long arm carries on its outer face an L-formed piece 54. The latter is seated in a mating recess 55 in the drum wall and has an ear 56 which projects into a complementary slot in the drum wall. The L-formed pieces serve to precisely locate the gear in coaxial relation to the drum. A clamp 57 associated with the long arm of each support serves to secure the ring gear assembly rigidly to the drum wall. Each clamp 57 includes a bolt which is adapted to be passed through the long arm 52 and freely through an opening in the drum wall; and further includes a flanged nut which is adapted to be drawn by the bolt in clamping relation to the drum wall. To remove the ring gear from the drum wall for replacement or otherwise, it is only necessary to remove the clamps 57.

The spindle assembly 20a shown in FIG. 3 is a relatively shortened version of that shown in FIG. 1 so as to enable it to be accommodated in the narrow space 58 existing between the brake spider 32a and the ring gear 19a. In FIG. 3, the spindle assembly is free of, and is not supported by, the brake spider as in FIG. 1. Instead, the spindle assembly is clamped fast between the arms of a U-bracket 59. The latter is anchored fast to the axle forwardly of the brake spider by means of a pair of clamping bolts 61a. The flexible casing and shaft assembly 38a, 44a extends in this embodiment from the spindle assembly freely through a relatively large open angular area 60 above the central body portion 31 of the brake spider. This manner of supporting the spindle assembly enables the latter to be adjusted both axially and angularly until a desired precise meshing relation is obtained between the pinion 26a and the ring gear 19a. When this desired relation is obtained, the bracket 59 is clamped fast to the axle 14a.

FIG. 4 shows a further embodiment which the invention may take. In this form, the ring gear 19b is not "buried" or confined deeply within the interior of the drum but is located adjacent the open end of the drum between the dust cover 36b and the opposed annular end wall 62 of the drum.

The ring gear 19b in FIG. 4 is defined by an annular body having gear teeth formed about its inner diameter, and having a rearwardly extending peripheral flange 63. The flange portion extends axially rearwardly for part of its length over the periphery of the drum and is welded fast to spacing blocks 64 fixed to, and spaced about, the drum's surface. The remainder of the flange extends axially forwardly and sufficiently away from the open end of the drum so as to space the gear portion from the drum. This spacing is desired so as to allow for engagement of the pinion with the gear without interference by neighboring elements. This spacing, together with clearance separating the spacing blocks 64, enables any dirt developing about the pinion and gear to escape through the spacing to the outside of the drum.

The spindle assembly 20b, which carries the pinion 26b, is located externally of the drum; it is fixed in a clamp 66 anchored upon the axle 14b. In this embodiment, as in the embodiment shown in FIG. 3, the engagement of the pinion 26b relative to the ring gear 19b may be precisely adjusted angularly and axially. The spindle assembly is drivingly coupled by the flexible casing and shaft assembly 38b, 44b to the externally located control assembly.

As a protective measure against entry of dirt and other foreign elements into the interior of the drum, and so as to shield the pinion and gear members against dust and dirt, the dust cover 36b is provided with an opening in which is fixed a pinion shield 67 (FIGS. 4, 5). The shield is in the nature of an annular container or can have an open front end to allow entry of the pinion 26b and a portion of the spindle assembly. The shield has a peripheral slot 68 in its side wall which allows protrusion of the pinion into engagement with the ring gear.

The embodiment shown in FIG. 6 is similar to that shown in FIG. 4 except that it omits the flexible casing and shaft assembly as well as the spindle assembly. In the FIG. 6 embodiment, the pinion 26c is mounted directly upon the input shaft 18c of the control device 12c and the control device is clamped, as at 16c, to the axle 14c proximate the drum so as to engage the pinion directly with the ring gear 19c so as to be driven directly by the latter. The pinion 26c is provided with a backing hub 69 so as to desirably extend its supporting surface over the input shaft. In this embodiment, the engagement of the pinion with the ring gear 19c can be precisely adjusted axially and angularly, as needed, by adjusting the clamped position of the control device along the axle 14c.

FIG. 7 indicates a form which the pinion member in the various embodiments may take.

Figure 8:
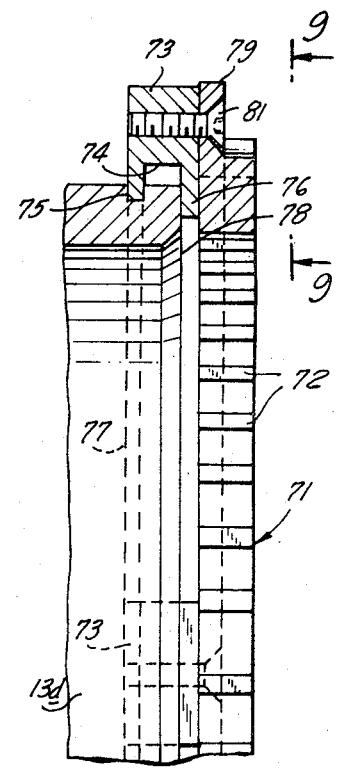
FIG. 8 is a fragmentary view taken on line 8—8 of FIG. 9; it illustrates a detachable arrangement of the ring gear with the brake drum, and shows a modified form of the gear teeth.
Figure 9:
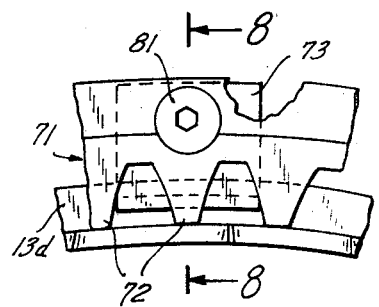
FIG. 9 is a section taken on line 9—9 of FIG. 8.

FIGS. 8 and 9 disclose a variation in the form of the ring gear shown in FIG. 4 and in the manner of mounting it to the open end of the brake drum. In this variation, the ring gear 71 is detachably clamped to the open end of the drum 13d.

The ring gear is defined by an annular plate having a succession of gear teeth 72 around its inner diameter. The gear is adapted to be mounted to the drum by means of a group of clamping elements 73 opportunely spaced about the drum. Each clamping element has parallel front and rear faces and a groove 74 extending along its underside to define a pair of legs 75, 76, one longer than the other. A groove 77 is provided around the periphery of the drum in close proximity to the open end of the drum to slidably receive the shorter legs of the clamps. When the shorter leg is received in the groove, the longer leg overlies the open end wall 78 of the drum to provide a self-cleaning space between the gear and the end of the drum.

To assemble the ring gear 71 to the drum, one of the clamps 73 is positioned on the drum with its short leg in the groove. The ring gear is then made to overlie the front face of the clamp so as to register an aperture in a peripheral flange 79 with a threaded hole in the clamp 73. A bolt 81 is then entered to secure the gear to the clamp. There is a series of apertures in the flange of the ring gear spaced angularly equally apart. A separate clamp is similarly mounted to the drum at each aperture and bolted to the gear. When the gear is tightly bolted to the several clamps, it will be restrained against axial and angular movement relative to the drum.

The form of the gear teeth shown in FIGS. 8, 9 is for purposes of illustration only since the teeth may take various forms. The pinion (not shown) with which the gear teeth may be associated for driving an anti-wheel lock-up control device, may have axially projecting elastomeric teeth of a general hexagonal form such as those referenced by the numeral 26 in FIG. 4 of U.S. Pat. No. 3,534,625.

What is claimed is:

1. A gear drive assembly for drivingly connecting the brake drum of a wheel of a motor vehicle to a rotary input shaft of an anti-wheel lock-up control device mounted externally of the drum upon a support of the vehicle, comprising: a ring gear adapted to be arranged in coaxial relation to the drum, means for securing the gear to the drum in such relationship for rotation as a unit with the drum, a pinion engageable with the ring gear, a spindle carrying the pinion, and a flexible shaft adapted at one end to have a driven connection with the spindle, and adapted at its opposite end to having a driving connection with the input shaft of the control device where the drum surrounds a brake spider having a stationary condition relative to the drum and an annular space is defined between the spider and a back wall of the drum, a spindle housing provides an internal bearing support for the spindle, the spindle housing being adapted to be positioned within the annular space, and clamp means is provided for clamping the spindle housing in a fixed position to a support within the drum having a stationary condition relative to the drum.

2. A gear drive assembly as in claim 1, wherein the clamp means is angularly adjustable relative to its support so as to enable angular adjustment of the spindle housing and as a consequence of the pinion carried by the spindle relative to the gear.

3. A gear drive assembly as in claim 2, wherein the spindle housing is adjustable axially relative to the clamp means before the clamp is tightened so as to obtain a precise axial disposition of the pinion relative to the gear.

4. In a motor vehicle including a wheel brake drum having an open end, an anti-wheel lock-up control device having an input drive shaft, a portion of the vehicle providing a support for the control device, a ring gear mounted to the drum adjacent the edge of its open end, the gear teeth being formed about an inner circumference of the gear, a dust cover having a stationary condition with the vehicle relative to the drum and covering over both the ring gear and the open end of the drum, a pinion mounted upon the input shaft, a dust shield for the pinion fixed in an opening of the dust cover and having an open end for reception of the pinion, the shield having a slot allowing protrusion of a segmental portion of the pinion into engagement with the ring gear, the control device being adjustable axially and angularly relative to the support so as to bring the pinion into precise toothed engagement with the ring gear, and clamping means for fixing the control device in its adjusted position to the support.

5. A motor vehicle including a wheel brake drum having an open end, an anti-wheel lock-up control device having an input drive shaft, the control device being located externally of and apart from the drum, a portion of the vehicle providing a support for the control device, a ring gear mounted coaxially to the drum adjacent its open end, the gear teeth being formed about an inner circumference of the gear, a pinion mounted upon the input shaft engaging the ring gear, means for adjusting the pinion axially and angularly relative to the support and to the ring gear so as to bring the pinion into precise toothed engagement with the ring gear, and clamping means for fixing the pinion in its adjusted position.

6. A motor vehicle including a wheel brake drum having an open end, an anti-wheel lock-up control device mounted externally of and apart from the drum having an input drive shaft, a portion of the vehicle providing a support for the control device, a ring gear mounted to the drum adjacent the edge of its open end, the gear teeth being formed about an inner circumference of the gear, a dust cover having a stationary condition with the vehicle relative to the drum and covering over both the ring gear and the open end of the drum, a flexible shaft drivingly connected at one end with the input drive shaft, a spindle connected to the opposite end of the flexible shaft, a pinion mounted to the spindle, a spindle housing providing an internal bearing support for the spindle, a dust shield for the pinion fixed in an opening of the dust cover and having an open end for reception of the pinion, the shield having a slot allowing protrusion of a segmental portion of the pinion into engagement with the ring gear, adjustable means mounting the spindle housing to a stationary part of the vehicle adjacent the drum for adjusting the spindle housing angularly and axially relative to the dust cover so as to bring the pinion into precise toothed engagement with the ring gear, and clamping means for fixing the spindle housing in its adjusted position.

\* \* \* \* \*